Sept. 23, 1969 T. TUFTO 3,469,174
CIRCUIT FOR REGULATING A D.C. VOLTAGE TO AN ELECTRICAL DEVICE
Filed Aug. 18, 1964 2 Sheets-Sheet 1

INVENTOR
Torleiv Tufto

INVENTOR
TORLEIV TUFTO
BY Albert M. Parker
ATTORNEY

United States Patent Office 3,469,174
Patented Sept. 23, 1969

3,469,174
CIRCUIT FOR REGULATING A D.C. VOLTAGE TO AN ELECTRICAL DEVICE
Torleiv Tufto, Oslo, Norway, assignor to Sentralinstitutt for Industriell Forskning, Oslo, Norway
Filed Aug. 18, 1964, Ser. No. 390,360
Claims priority, application Norway, Sept. 2, 1963, 149,936
Int. Cl. G05f 1/40
U.S. Cl. 323—22
3 Claims

ABSTRACT OF THE DISCLOSURE

The D.C. voltage supplied to an electrical device is regulated by a circuit comprising two alternatively conducting and blocked thyristors. Timing means including a variable resistor permits regulation of the conducting and blocked intervals and overload protection is provided to limit the maximum current by increasing the blocked periods.

---

This invention refers to a circuit for regulating a D.C. voltage to an electrical device by means of two alternately conducting and blocked switching elements, preferably thyristors, the periods during which the switching element are conducting or blocked being varied.

Such circuits are known and comprise in principle two alternately conducting and nonconducting thyristors, two capacitors controlling the nonconducting periods of the thyristors, two resistors each connected to each capacitor to control their changing time and a third capacitor to apply a reverse potential to one of said thyristors when the other thyristor conducts.

An object of the invention is to provide an improved circuit of the above mentioned type.

Usually it is desirable to set an upper limit to the current consumed by the load device. In such case a pure current limiting circuit or negative current compounding may be used, provided that the current through the load device is measured. In known circuits such measurements are performed continuously by means of a shunt which results in large losses, or by means of a Hall generator or a measuring transductor, both of which are expensive.

Another object of the invention is to provide a new overload protection means for direct current regulating circuits comprising two thyristors.

According to the invention, a circuit for regulating a direct current voltage through an input circuit comprising positive and negative supply terminals, comprises a first alternately conducting and nonconducting thyristor being coupled with its anode to a first capacitor and an output circuit of the load device and with its cathode to the negative terminal to block the first thyristor when the second thyristor starts conducting, a choke and a diode in series coupled in parallel to the second thyristor to apply a reverse potential across the first capacitor during the conducting period of the first thyristor in order to provide conducting of the second thyristor, time measuring means connected to both sides of the first capacitor for controlling the periods the thyristors are nonconducting and overload protection means for decreasing the conducting periods of the first thyristor by deriving control signals from the load current in periods when the first thyristor is conducting and feeding said control signals to the time measuring means.

Advantageously the time measuring means comprises a first variable resistor connected with its one end to one side of the first capacitor and to the anode of the first thyristor and with its other end to the negative terminal through a second capacitor connected to a first unijunction transistor for the second thyristor, the charging of which capacitor controls the nonconducting period of the second thyristor. In such case the overload protection means preferably comprises a transformer having inductively coupled primary and secondary windings, the primary winding being connected with its center tap to the output side of the load device, with its one end to the input side of the load device through a first diode and with its other end to the anode of the first thyristor, the secondary winding being connected to a first circuit comprising a fourth capacitor in series with a second diode and a zener diode connected to the third capacitor to provide decreased charging time of this capacitor, and thus decreased conducting periods.

In order to increase the effect of overload protection the blocking period can be increased in addition to decreasing the conducting period, by connecting the secondary winding of the transformer to both the first circuit and to a second circuit comprising a fifth capacitor in series with a third diode directed from the negative terminal to the output side of the secondary winding, this fifth capacitor being coupled in parallel to the second capacitor through a fourth diode directed from the second to the fifth capacitor to provide increased charging time of the second capacitor, and thus increased nonconducting periods.

An example of the invention will be explained below with reference to the drawings.

Figure 1:
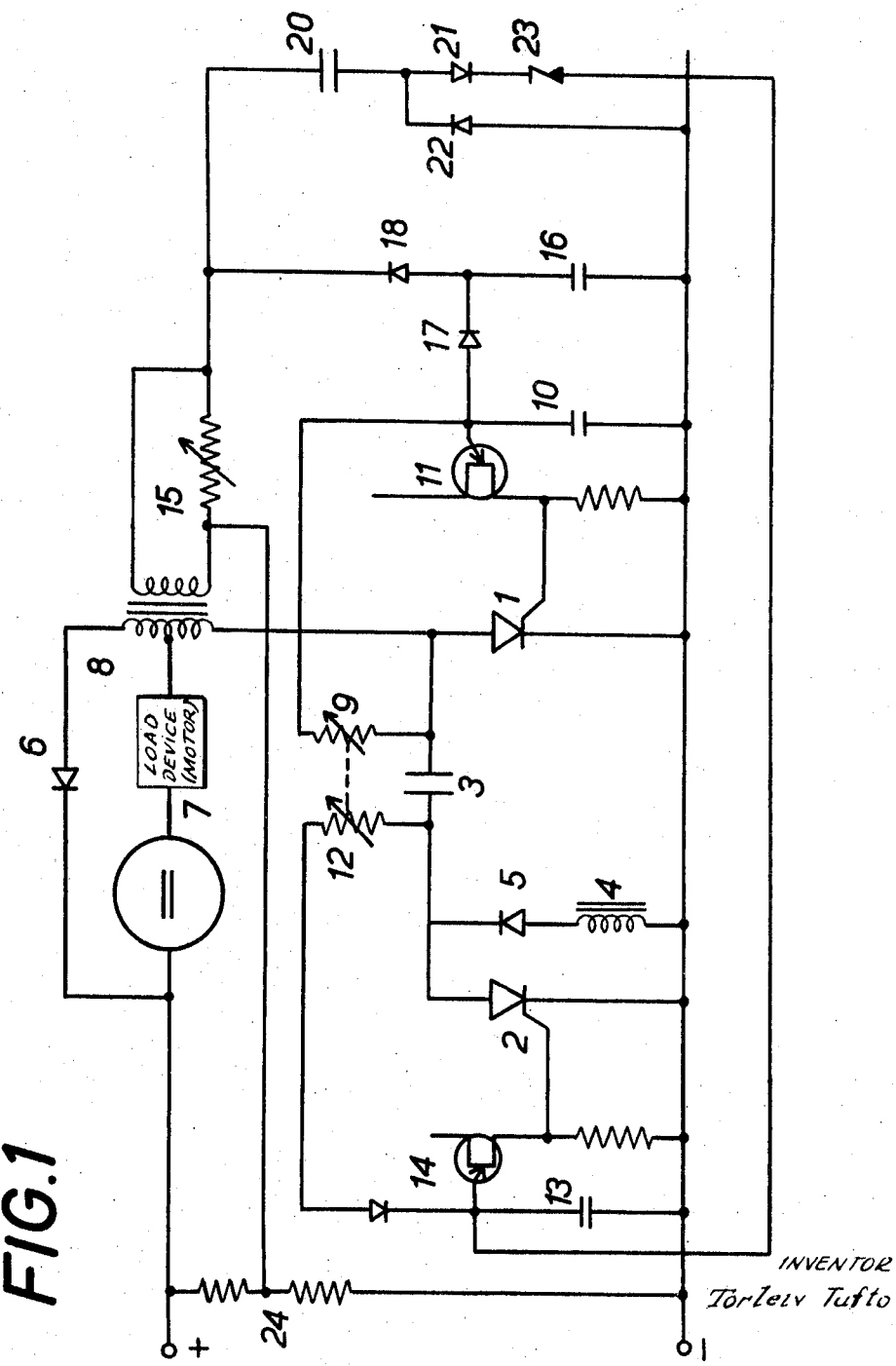
FIGURE 1 is a circuit diagram of a system, according to the invention, for regulating an electrical device in the form of a series motor.

The main part of the circuit shown in FIGURE 1 includes positive and negative supply terminals and an electrical motor winding 7 being coupled to a first alternately conducting and nonconducting thyristor 1 having its cathode connected to the negative supply terminal and its anode to the one side of a capacitor 3, the other side of which being connected to a second alternately conducting and nonconducting thyristor 2 having its cathode connected to the negative terminal. A choke 4 and diode 5 in series are coupled in parallel to the thyristor 2, the diode 5 being poled from the negative terminal to the anode of the thyristor 2.

The time measuring means for controlling the periods that the thyristors 1 and 2 are in a nonconducting state, comprises in this example a first variable resistor 9 connected with its one end to the one side of the capacitor 3 and to the anode of the thyristor 1. The other end of the resistor 9 is coupled to the negative supply terminal through a capacitor 10 that is coupled to a unijunction transistor 11 which again is coupled to the gate of thyristor 1. Further the time measuring means comprises another variable resistor 12 connected with its one end to the other side of the capacitor 3 and to the anode of the thyristor 2. The other end of the resistor 12 is coupled to the negative terminal through a capacitor 13 that is coupled to a unijunction transistor 14 which is coupled to the gate of thyristor 2.

The thyristors 1 and 2 are alternately conducting and nonconducting. In the nonconducting period of the circuit as such, the thyristor 1 is blocked, and in the conducting period thyristor 1 is conducting. The function of such circuit may be best explained by describing the function in the nonconducting and conducting periods separately.

In the nonconducting period the thyristor 1 is in its blocked position. The current then flows from the positive supply through the motor winding 7 and charges the capacitor 3. When the capacitor 3 has been charged, the capacitor 10 will also be charged through the preset resistor 9 to a potential corresponding to the firing voltage of the unijunction transistor 11 during a period which is predetermined by the setting of the potentiometer 9. Thus, when the unijunction transistor 11 is fired, the thyristor 1 becomes conducting and current flows through the load. The blocking period is then ended.

In the conducting period the electrode of capacitor 3 connected to the thyristor 1 is brought to the potential of the negative supply terminal and the other electrode of the capacitor falls to below the potential of the negative supply terminal. Current therefore flows from the negative supply terminal to the capacitor 3 through choke 4 and diode 5, and this current does not cease when the potential across capacitor 3 is zero, as the current through a choke cannot change instantaneously. The capacitor 3 therefore charges up with the potential across it opposite to that previously and part of this charge is transformed through resistor 12 and a diode 28 in series with resistor 12, to the capacitor 13. The potential across capacitor 13 increases until it exceeds the firing voltage of unijunction transistor 14 when thyristor 2 is caused to conduct. Capacitor 3 then discharges through thyristor 2 and charges up in the opposite sense, i.e., in the sense originally referred to, an dthe whole cycle is repeated. When thyristor 1 is caused to conduct, the potential across capacitor 3 prevents thyristor 2 conducting, and similarly when thyristor 2 is caused to conduct, the potential across capacitor 3 prevents thyristor 1 conducting. It will be noted that the value of resistor 12 determines the length of the conducting period of the thyristor 1 and of the blocked period of thyristor 2, and the value of resistor 9 determines the length of the blocked period of thyristor 1 and of the conducting period of thyristor 2. In the remainder of this specification the unqualified terms "conducting period" and "blocked period" refer to thyristor 1.

Figure 2:
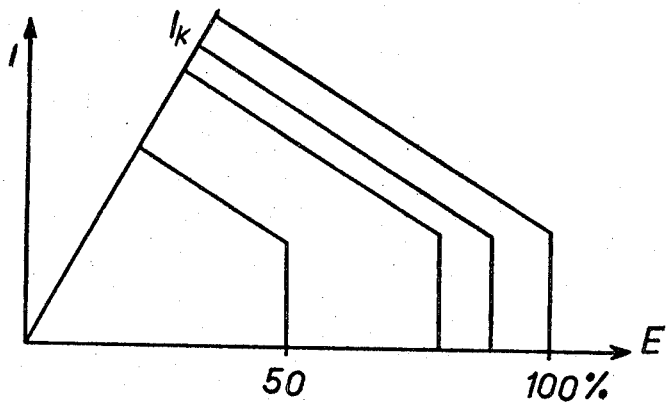
FIGURE 2 shows the control characteristics with the adjustment of the control resistor as parameter.
Figure 3A:
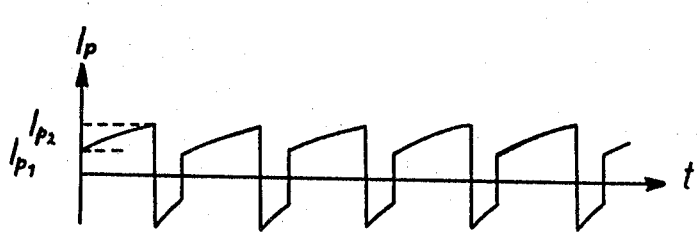
FIGURE 3a shows the current in the primary winding of the transformer 8.
Figure 3B:
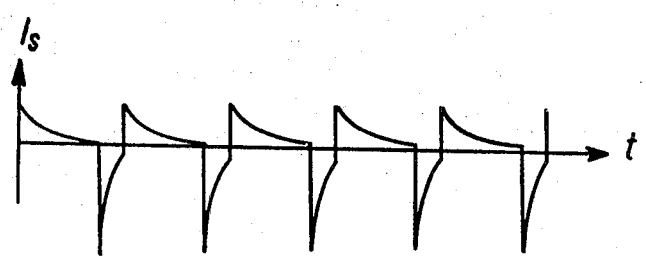
FIGURE 3b shows the current in the secondary winding of the transformer 8.

The control characteristics shown in FIG. 2 represent the current through the series motor 7 as a function of the voltage across the motor. The range of regulation is limited by the straight line through the origin, this line representing the current $I_K$ through the stationary rotor of the series motor 7. The characteristic which corresponds to the highest voltage setting can, for example, coincide with the largest load permitted for thyristor 1. The thyristor 1 can stand higher instantaneous loads at lower voltages, because the length of the conducting period decreases with voltage. This can be utilized for achieving a high starting current.

In order to limit maximum current, overload protection means is provided by means of a transformer 8 having inductively coupled primary and secondary windings. The primary winding is connected with its center tap to the output side of the motor winding 7, with its one end to the input side of the winding 7 through a diode 6 and with its other end to the anode of the thyristor 1. Through a variable resistor 15, the secondary winding is connected to a first circuit for decreasing the conducting periods of thyristor 1 and to a second circuit for increasing the blocked periods of thyristor 1. The first circuit comprises a capacitor 20, diodes 21 and 22, a Zener diode 23, the Zener diode being connected to the capacitor 13. The second circuit comprises a capacitor 16 in series with a diode 18, which capacitor 16 is coupled in parallel to the capacitor 10 through a diode 17 poled from capacitor 10 to capacitor 16.

When a conducting period occurs, i.e. when thyristor 1 starts conducting, current flows through the motor winding 7 and half of the primary winding of transformer 8 through thyristor 1, i.e. in the direction from diode 6 to thyristor 1. This causes a positive voltage jump in the secondary winding. If this jump is higher than a certain value, a certain current will flow to the capacitor 13 through the diode 21 and Zener diode 23. Thus the unijunction transistor 14 will fire sooner and cause the thyristor 2 to conduct sooner so that the thyristor is blocked sooner. Consequently a shorter conducting period occurs so that the current through the winding 7 is limited.

When a nonconducting period occurs, i.e. as soon as thyristor 1 is blocked, the current will flow through the other part of the secondary winding and through the diode 6 due to the inductivity of the winding 7, i.e. in the direction from thyristor 1 to diode 6. This causes a negative jump of voltage in the secondary winding. In this starting moment, the potential across capacitor 16 equals the firing voltage of the unijunction transistor 11. If the negative jump is so high that the voltage in the coupling point between resistor 15 and diode 18, becomes lower than the firing voltage of the unijunction transistor 11, a current will flow through the capacitor 16 and diode 18 to this coupling point. Thus a lower charge is obtained on the capacitor 16 and the transistor 11 will fire later with the result that the thyristor 1 is later set in a conducting state. This means that a longer nonconducting period is obtained. Thus the current through the motor winding 7 will be limited in a still higher degree.

It will be understood that circuits for obtaining decreased conducting periods are not dependent upon circuits for obtaining increased nonconducting periods.

The function of the overload protection means will now be explained more specifically.

When thyristor 1 conducts, a jump occurs in the secondary voltage, thus:

$$2I_{P1}\frac{N_1}{N_2}R_{15}$$

in which $I_{P1}$ represents the value of the current in the primary side at the start of the conducting period; $N_2$ and $N_1$ being the number of turns on the secondary and primary windings respectively. The corresponding jump in voltage when diode 6 conducts is as follows:

$$2I_{P2}\frac{N_1}{N_2}R_{15}$$

in which $I_{P2}$ represents the value of the primary current at the end of the conducting period. If the time constant of the transformer's secondary circuit is much shorter than the length of the shortest period occurring, the value of the peak voltage will be as follows:

$$E_s = 2(I_{P1} - I_{P2})\frac{N_1}{N_2}R_{15}$$

At the end of the conducting period, the voltage over resistor 15 reaches its negative peak value. A condenser 20, is discharged to this voltage through a diode 22. At the end of the conducting period, the voltage across resistor 15 increases to its positive peak value. Condenser 20 is then recharged through a Zener diode 23, diode 21 and condenser 13. Thus, at the beginning of a conducting period, the charge carried by condenser 13 is that which corresponds to the voltage:

$$E_{13} = \frac{C_{20}\left(2(I_{P1}-I_{P2})\frac{N_1}{N_2}B_{15} - E_Z\right)}{C_{13} - C_{20}}$$

in which $E_Z$ is the Zener voltage for the Zener diode, 23. As will be seen from the above equation, an increasing current gives a higher initial value for the voltage across condenser 13. It will thus take a shorter time for the condenser on charging through resistor 12 to reach the firing voltage of the unijunction transistor. An increase in current thus results in a decrease in the length of the conducting period.

The current influences the length of the blocked period because condenser 16 at the beginning of the blocked period is discharged through diode 18 to a voltage equal to the voltage extracted from a voltage divider 24, minus the peak negative value of the voltage across resistor 15. The voltage across condenser 16 is thus:

$$E_{16}=E_{24}-21_{P2}\frac{N_1}{N_2}R_{15}$$

Capacitor 16 charges up again through a diode 17 during the blocked period in parallel with condenser 10 to a voltage which is equal to the firing voltage of the unijunction transistor 11. As the charge on capacitor 16 at the beginning of the blocked period influences the time taken to charge capacitor 10, the length of the blocked period will increase as the current $I_{P2}$ increases.

I claim:

1. A circuit for regulating a direct current voltage supplied to an electrical load device through an input circuit comprising positive and negative supply terminals, said regulating circuit comprising a first alternately conducting and nonconducting thyristor being coupled with its anode to a first capacitor and an output circuit of said load device and with its cathode to said negative terminal to provide conducting of said first thyristor and supply of load current in the conducting period of said first thyristor, a second alternately conducting and nonconducting thyristor being coupled with its anode to the anode of said first thyristor through said first capacitor and with its cathode to said negative terminal to block said first thyristor when said second thyristor starts conducting, a choke and a diode in series coupled in parallel to said second thyristor to apply a reverse potential across said first capacitor during the conducting period of said first thyristor in order to provide conducting of said second thyristor, time measuring means connected to both sides of said first capacitor for controlling the periods said thyristors are nonconducting and overload protection means for decreasing the conducting periods of said first thyristor by deriving control signals from the load current in periods when said first thyristor is conducting and feeding said control signals to said time measuring means.

2. A circuit as claimed in claim 1 in which said time measurng means comprises a first variable resistor connected with its one end to one side of said first capacitor and to the anode of said first thyristor and with its other end to said negative terminal through a second capacitor connected to a first unijunction transistor for said first thyristor, the charging of which capacitor controls the nonconducting period of said first thyristor, and comprises a second variable resistor connected with its one end to the other side of said first capacitor and to the anode of said second thyristor and with its other end to said negative terminal through a third capacitor connected to a second unijunction transistor for said second thyristor, the charging of which capacitor controls the nonconducting period of said second thyristor, and in which said overload protection means comprises a transformer having inductively coupled primary and secondary windings, said primary winding being connected with its center tap to the output side of said load device, with its one end to the input side of said load device through a first diode and with its other end to the anode of said first thyristor, said secondary winding being connected to a first circuit comprising a fourth capacitor in series with a second diode and a Zener diode connected to said third capacitor to provide decreased charging time of this capacitor, and thus decreased conducting periods.

3. A circuit as claimed in claim 2 in which said secondary winding is also connected to a second circuit comprising a fifth capacitor in series with a third diode directed to said secondary winding, said fifth capacitor being coupled in parallel to said second capacitor through a fourth diode directed from said second to said fifth capacitor to provide increased charging time of said second capacitor, and thus increased nonconducting periods.

References Cited

UNITED STATES PATENTS 3,242,346    3/1966    Skoubo _____ 323—22
3,150,307    9/1964    Kaeding _____ 323—22

JOHN F. COUCH, Primary Examiner

A. D. PELLINEN, Assistant Examiner

U.S. Cl. X.R.

321—45